United States Patent
Jacobson

Patent Number: 5,227,972
Date of Patent: Jul. 13, 1993

[54] MATCHED FILTER DATA SMOOTHING SYSTEM

[75] Inventor: Larry A. Jacobson, Richmond, Tex.

[73] Assignee: Halliburton Logging Services, Inc., Houston, Tex.

[21] Appl. No.: 408,590

[22] Filed: Sep. 18, 1989

[51] Int. Cl.$^5$ .............................................. G01V 5/00
[52] U.S. Cl. .................................. 364/422; 364/553; 364/724.01; 364/724.12
[58] Field of Search ................... 364/422, 724.01, 553, 364/724.12

[56] References Cited

U.S. PATENT DOCUMENTS

| | | | |
|---|---|---|---|
| 4,156,914 | 5/1979 | Westell | 364/515 |
| 4,467,425 | 8/1984 | Schaefer et al. | 364/422 |
| 4,777,428 | 10/1988 | Lundback | 324/609 X |

OTHER PUBLICATIONS

*Computers in Physics*, Nov./Dec. 1987, Hayden, "Data Smoothing Routine", pp. 74-75.

Primary Examiner—Roy N. Envall, Jr.
Assistant Examiner—David Huntley
Attorney, Agent, or Firm—William J. Beard

[57] ABSTRACT

An efficient spatial smoothing algorithm for filtering data while preserving spatial detail is obtained using the system (impulse response) function of the sensor. In contrast to the normal procedure for determining the filter coefficients for an arbitrary system function, this technique avoids the use of Fourier transforms. The spatial filtering coefficients are obtained analytically for the frequently applicable Gaussian system function. The efficiency of this procedure is illustrated by filtering discrete data. For realtime smoothing of nuclear log data, a filter length of five times the vertical resolution is required.

10 Claims, 12 Drawing Sheets

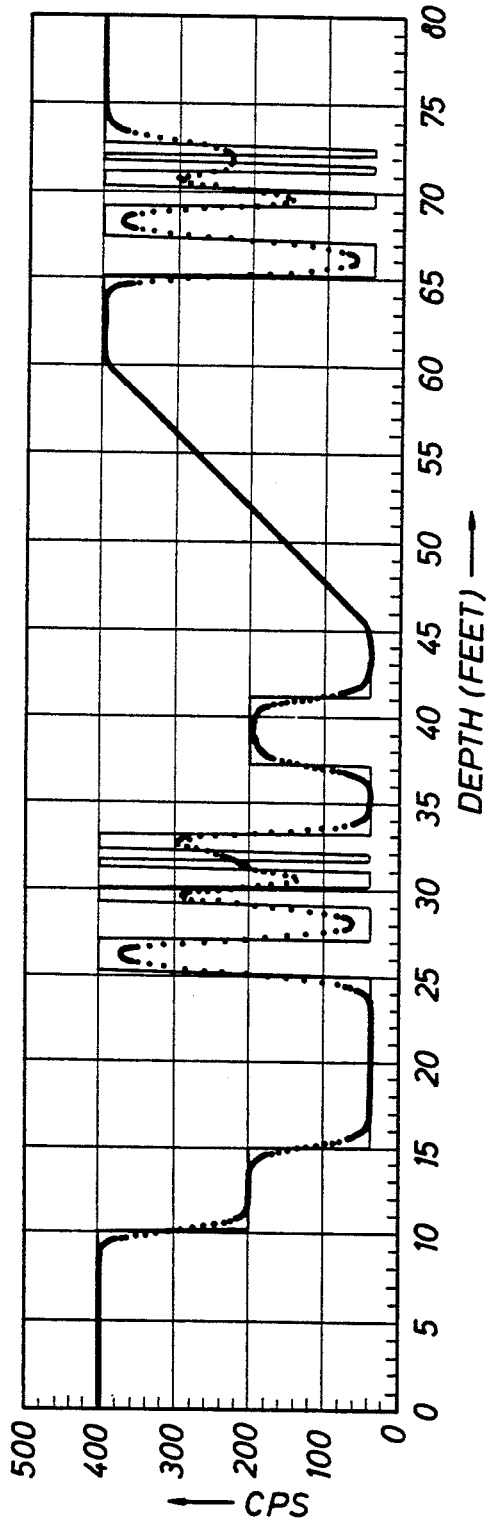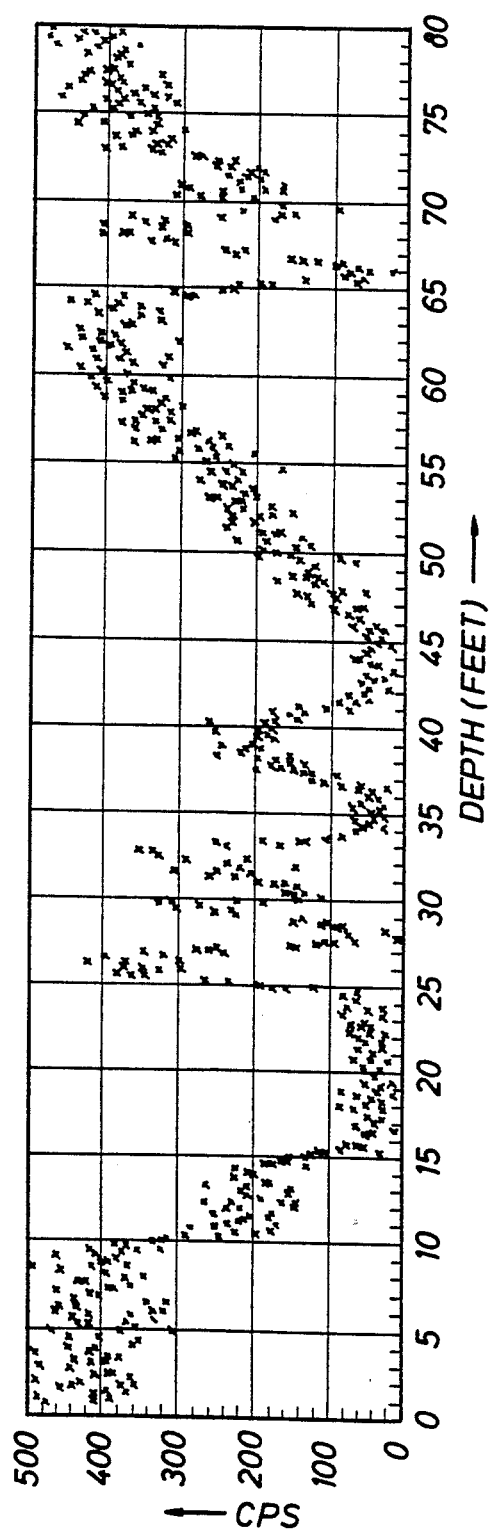

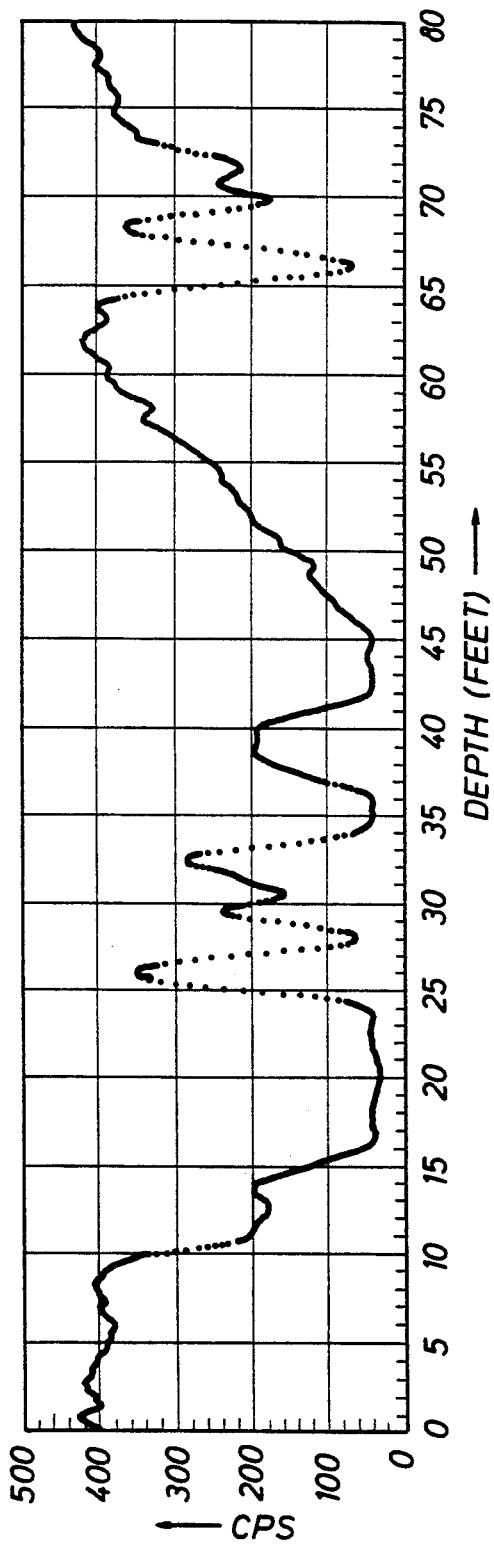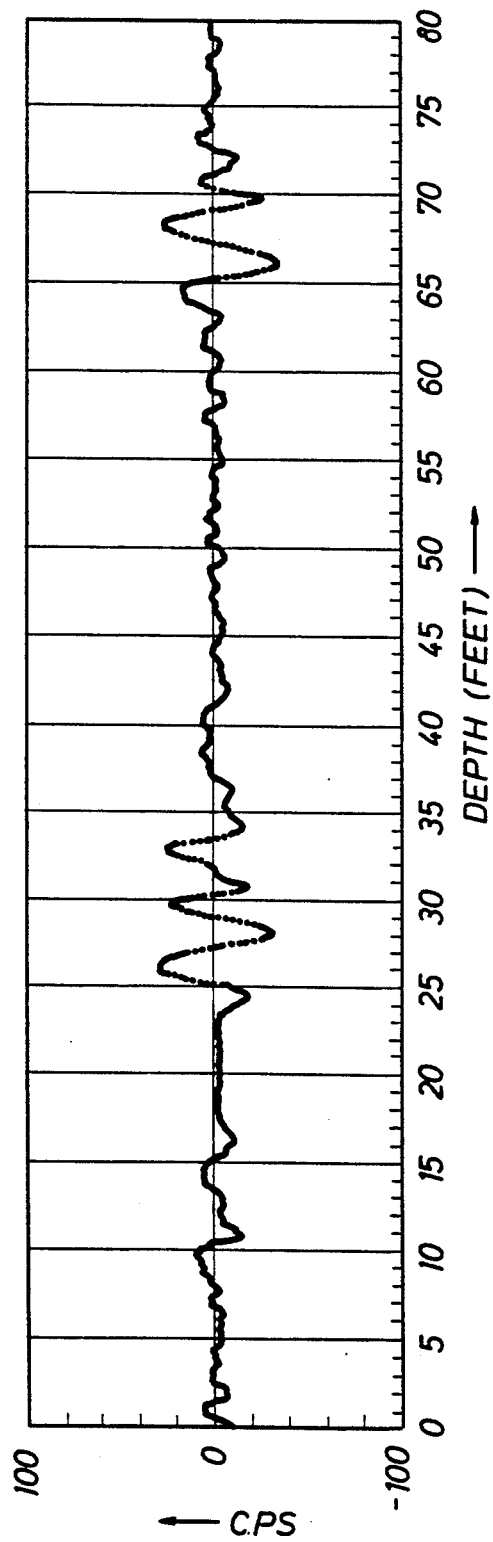

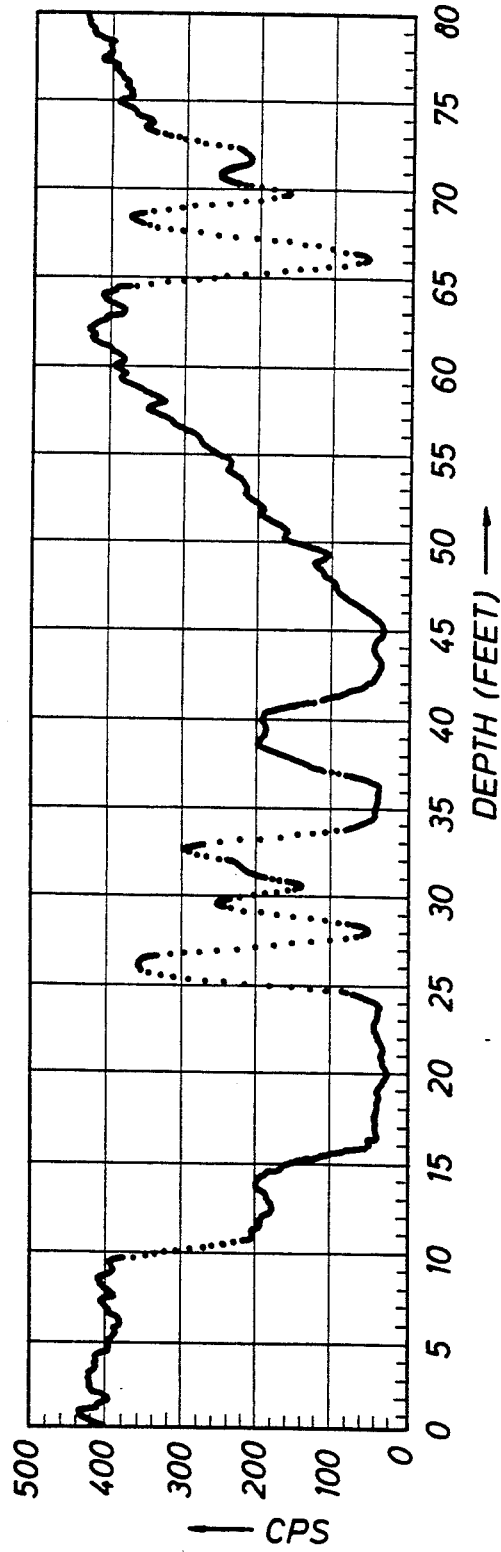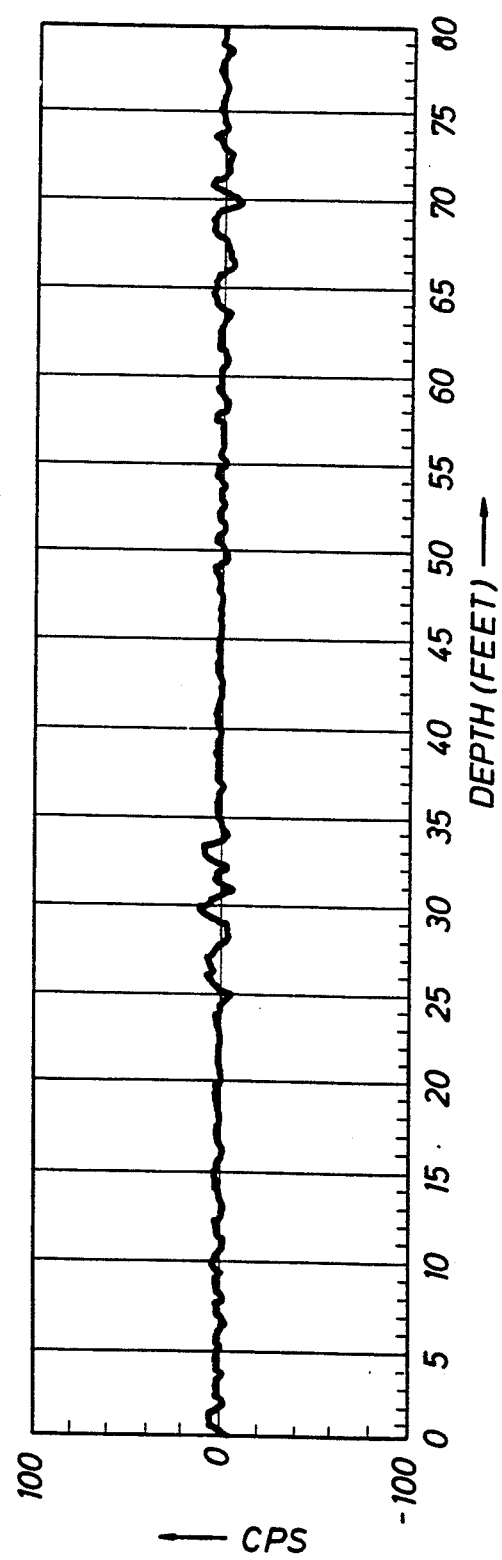

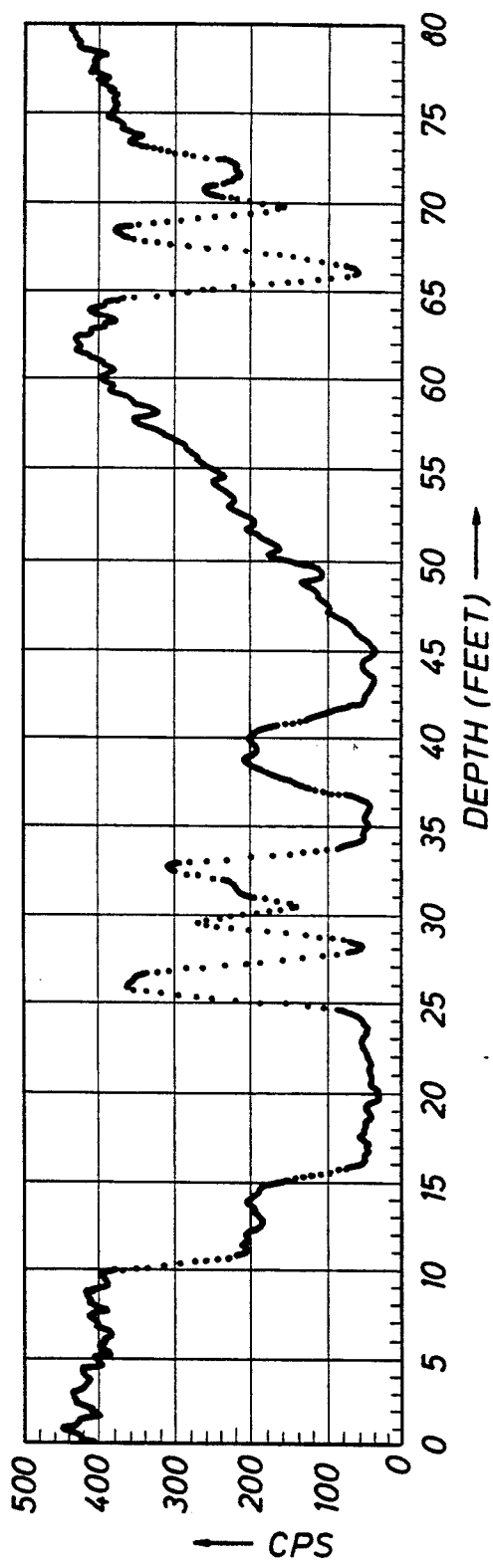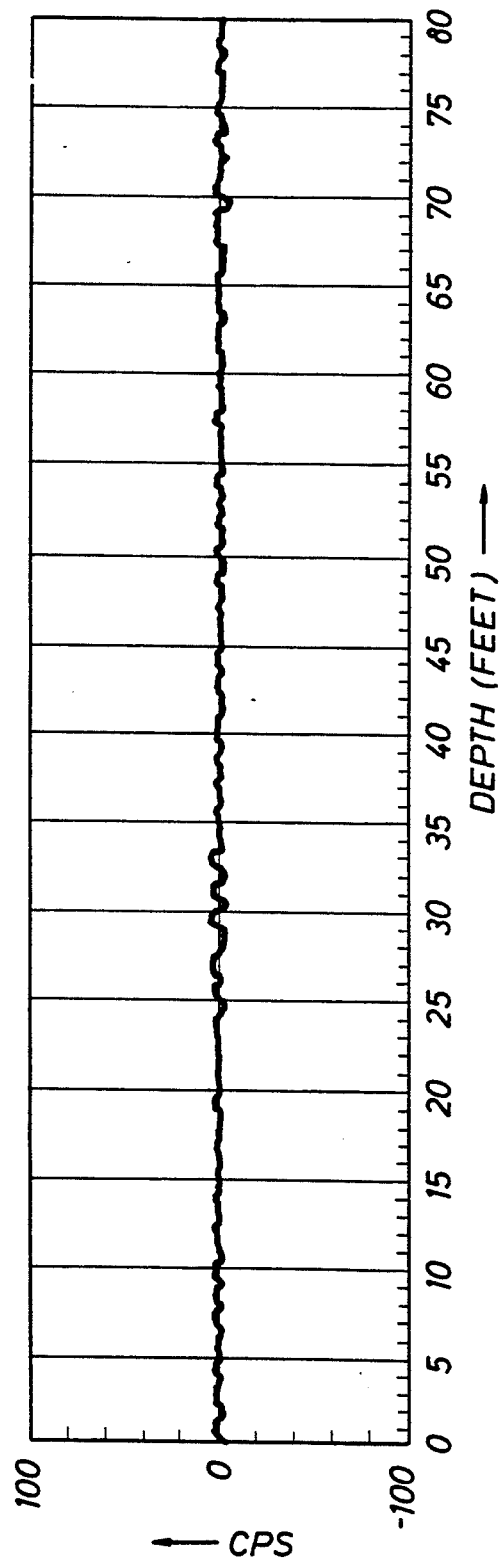

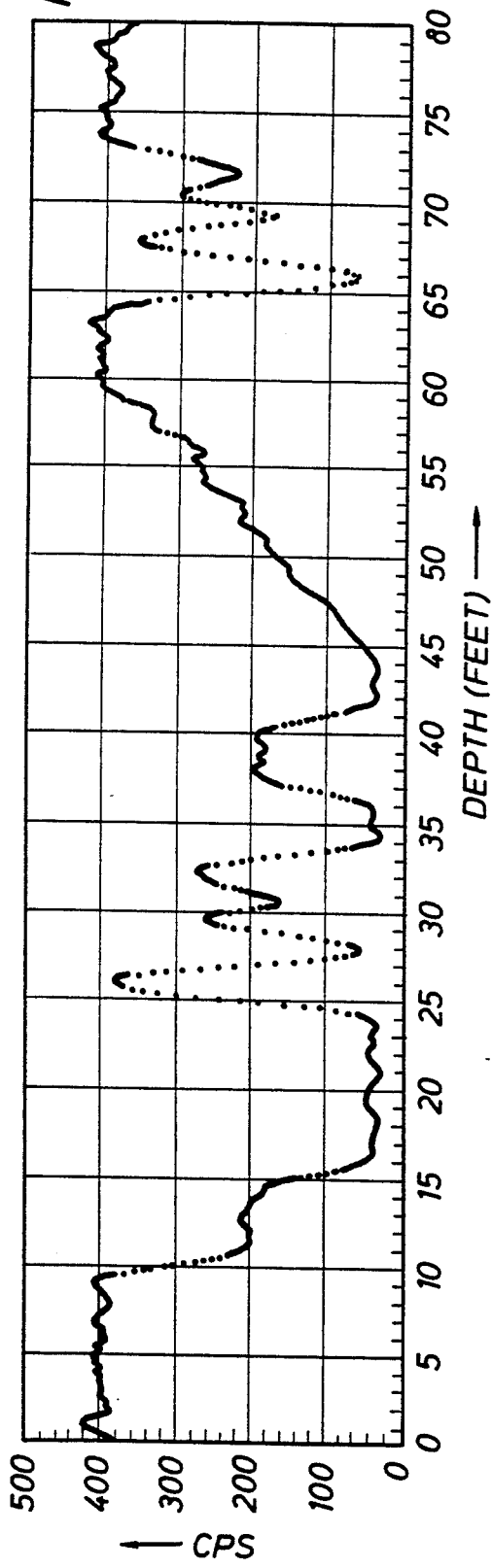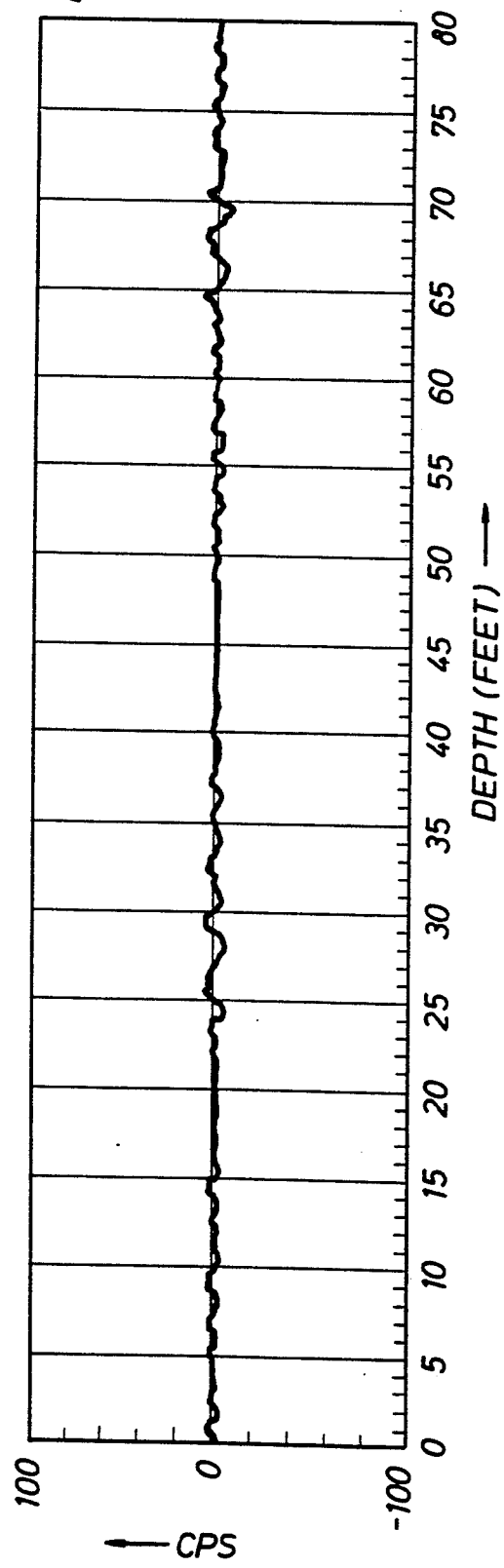

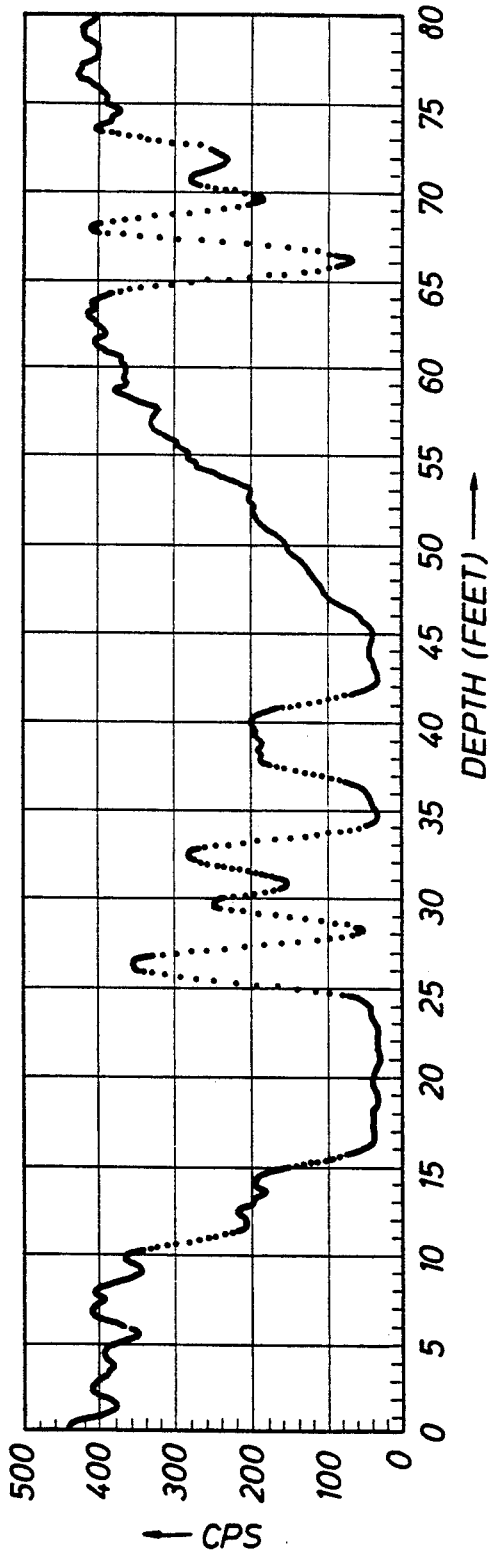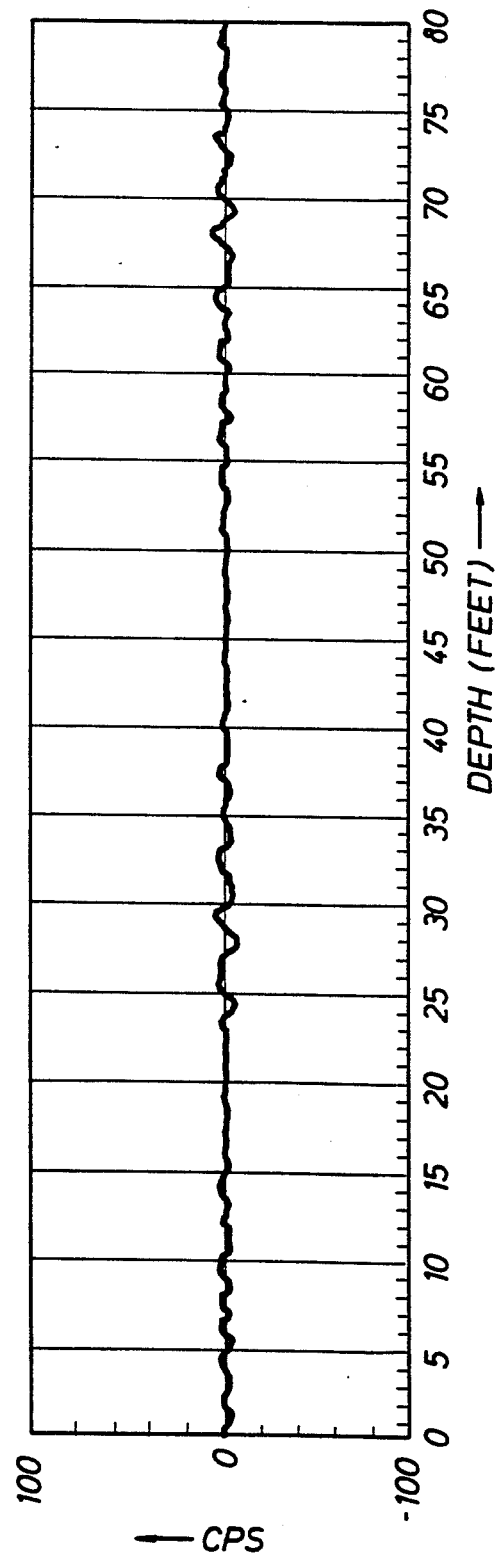

MATCHED FILTER DATA SMOOTHING SYSTEM

BACKGROUND OF THE DISCLOSURE

Signal enhancement and noise reduction is usually accomplished through data smoothing if the intrinsic signal shape is not distorted in the smoothing process. Excessive smoothing, however, can actually reduce the signal-to-noise ratio. In logging data, a compromise must be made between noise reduction and the preservation of the vertical detail intrinsic to the sensor. Because the vertical resolution of nuclear tools is typically around one foot smoothing filters wider than this results in a loss of vertical detail. The current practice is to sample at half foot intervals with either a three point rectangular or triangular running average filter of the raw data. Increasingly, finer sampling is being employed. Service companies using finer sampling rates, such as 0.1', must use spatial filters wider than the sample period to reduce the log noise.

It is important to distinguish between two related but distinct concepts, namely, data smoothing and deconvolution. The object of data smoothing is to reduce noise and enhance the signal, but this may reduce the vertical detail. In contrast, deconvolution enhances vertical detail but results in increased noise, see A. M. Morland, "Special log processing for thin zones using geological impulse response functions, with particular application to total and spectral gamma ray logs," *The Log Analyst*, vol. 25, no. 76, p. 23, 1984. Several publications addressing the deconvolution problem introduced external information to achieve both vertical sharpening and noise reduction. For example,. see J. A. Czubek, "Quantitative interpretation of γ-ray log in presence of random noise", presented at the SPWLA 27th Annual Logging Symposium, on Jun. 9-13, 1986, Houston, Tex. Paper KKK. Also, W. D. Lyle and D. M. Williams, "Deconvolution of well log data—an innovations approach", *The log Analyst*, vol. 28, no. 3, p.i. 32, 1987. Another is C. J. Dyos, "Inversion of well log data by the method of maximum entropy", presented at the 10th European Formation Evaluation Symposium, on Apr. 22-15, 1986, Aberdeen, Scotland, Paper H. P. Shen, B. White, B. Nair and S. Kerford, "Bayesian deconvolution of γ-ray logs", *Geophysics*, vol. 52, no. 11, p. 1535, 1987. These techniques are computationally intensive and are applied after logging. The difficulty and extensive nature of data conversion by excessive computation inherently prevents the provision of realtime output. By contrast, the present disclosure is directed to a system which is markedly simple in comparison and is therefore able to provide an output which is substantially in realtime. That is, data is recorded continuously as the tool moves up the borehole, typically taking readings at designated intervals along the borehole, data is output as rapidly as sufficient data vertically of the borehole is obtained. In part, this depends on the spacing of data points along the borehole. The present system, however, is very useful in obtaining data with close spacing, even as close as 0.1 foot. To avoid a computationally intensive procedure like deconvolution, some procedures employ secondary data from intrinsically sharper devices to enhance the vertical details. See for example J. E. Galford, C. Flaum, W. A. Gilchrist, Jr., and S. W. Duckett, "Enhanced resolution processing of compensated neutron logs:, presented at the 61st Annual Technical Conference and Exhibition of SPE, on Oct. 5-8, 1986, New Orleans, LA, Paper 15541. C. Flaum, J. E. Galford and A. Hastings, "enhanced vertical resolution processing of dual detector gamma-gamma density logs", presented at the SPWLA 28th Annual Logging Symposium, on Jun. 29-Jul. 2, 1987, London, England, Paper M. The Flaum article may also relate to the procedure disclosed in U.S. Pat. No. 4,786,796 which involves matched sensor signals in a dual detector system.

Realtime data smoothing must rely on computationally efficient (and therefore mathematically simple) methods to achieve good noise reduction without a serious loss of vertical detail, such as described by W. E. Schultz and S. G. Thadani, "Applications of digital filtering techniques to nuclear well logs", presented at the SPWLA 22nd Annual Logging Symposium, on Jun. 23-26, 1981, Mexico City, Mexico, Paper UU. Adaptive filters were developed to recognize the logging data where signal level is substantially constant with depth and provide extra smoothing in these regions; see, for example, G. L. Mathis, "Smoothing spectral gamma logs: A simple but effective technique", *Geophysics*, vol. 52, no. 3, p. 363, 1987. There are also filters designed with information from other logs to assist in recognizing bed boundaries. Unfortunately, these techniques are still more computationally intensive than simple filtering since filtering coefficients must be frequently recomputed. Digital filters formed of n serially connected stages typically involve $c_n$ coefficients which must be calculated on each discrete input, or perhaps in a compromise to reduce computation, such $c_n$ coefficients must be recalculated at least periodically if not on every data input.

A previously reported iterative smoothing algorithm that is simple, computationally efficient and effective in preserving sharpness is described by H. C. Hayden, "Data smoothing routine", *Computers in Physics*, Nov/Dec 1987. Since this algorithm uses the system (impulse response) function of the sensor as a filter, the sharpness of the data is preserved to within the limits of this function while removing random noise. This filter can be applied to log data and spectral data. Simulated and real log data is presented that illuminates the characteristics of this procedure. The results reveal that only a few iterations are required to obtain satisfactory results. Furthermore, the performance is not strongly dependent on the actual shape of the system transfer function. Finally, a single pass procedure is developed which is exactly equivalent to the iterative procedure. The use of a single pass procedure remarkedly reduces the computations necessary which would otherwise be involved in a iterative procedure involving several of data. The single pass procedure thus enables substantial presentation of data in realtime. By contrast, a multiple pass iterative procedure can theoretically be accomplished in realtime, but it typically requires repeated convolution of the filter function with the data requiring a large computing capacity. This militates against the use of smaller computers in the field where the logging equipment is typically operated. It is not uncommon for the logging equipment to be required in extremely remote locations so that only portable equipment can be used. There is a limit to size even with truck-mounted portable computers. Accordingly, as a practical matter, realtime computation is made possible where a single pass technique is used as is taught in the present disclosure. Spatial filtering coefficients are computed from the system function directly so that only a single pass is required; in the case of a Gaussian system function, an analytic expression for the filter coefficients is derived.

By the implementation of a single pass system, computational requirements are markedly reduced. Moreover, precise premeasurement of the system transfer function is not such a rigid requirement. The preferred embodiment employs a Gaussian system function, whether the equivalent of one pass or several passes, because the Gaussian system transfer function can be easily calculated. As will be shown hereinafter, multiple passes through a Gaussian system function involves convolution (and inherently deconvolution) and there is an ease or simplicity obtained by resort to the Gaussian function.

The present disclosure is therefore summarized as a downhole logging system particularly adapted for use with nuclear logging devices or other logging devices which provide discrete output measurements. There is a determinable system transfer function involved in the sensor. It is typically modeled after a Gaussian transfer function so that calculation thereof is relatively straight forward. A filter which has a transfer function in accordance with the teachings of this disclosure is incorporated in the data flow path. The filter enables noise reduction and improvement of the signal to noise ratio while maintaining virtually all of the intrinsic vertical detail.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 1A and 1B include depth dependent plots where the upper curve at FIG. 1A shows a representative or arbitrary intrinsic profile dependent on depth of a typical log (solid curve) scaled in counts per second versus depth; the discrete data of FIG. 1A is a solid curve smeared by the sensor system function and is sampled at 0.1 foot intervals. FIG. 1B shows the discrete data after random noise has been added;

FIG. 3A shows an upper plot at FIG. 3A similar to FIG. 1A where the depth profile has been processed repetitively in accordance with the function shown in FIG. 3A, and the lower curve at FIG. 3B shows the filtered noise;

FIGS. 4A and 4B bare similar to FIGS. 3A and 3B except that the filtering process has been extended for additional approximations, and further illustrates decreasing filtered noise;

FIGS. 5A and 5B are graphs similar to FIGS. 3A, 3B, 4A and 4B showing further processing;

FIGS. 6A, 6B, 7A and 7B are similar plots to other graphs showing fourth approximations applied to different sets of statistical data;

FIGS. 8A and 8B show a similar fourth approximation obtained with a different system transfer function in contrast with other graphs;

MATHEMATICAL DEVELOPMENT OF THE UNDERLYING NOISE REDUCTION SYSTEM

Figure 2:
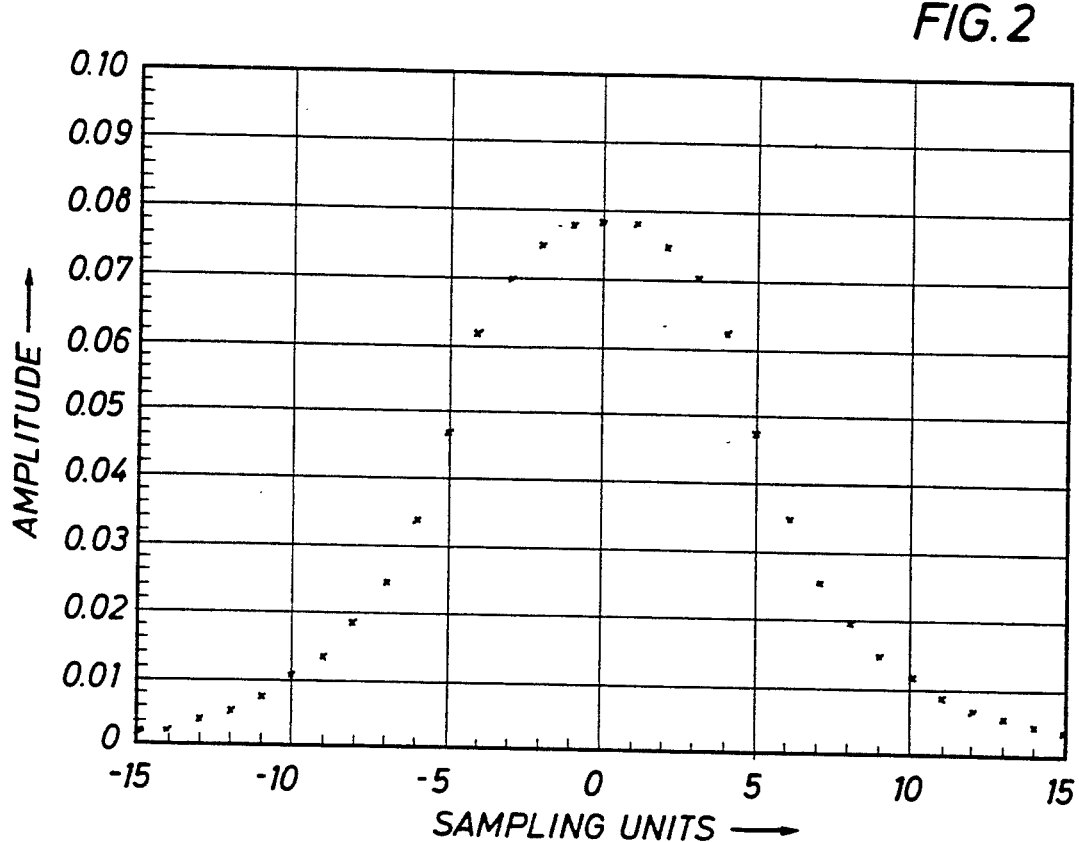
FIG. 2 is a system transfer function plot for a normalized amplitude.

Before proceeding with the mathematical details, several quantities must be defined and explained. The function, x(i), is either a sequence of data such as raw detector counts per depth sample or counts per channel in a spectrum. In both instances, x(i), is composed of the signal and statistical noise: $x(i)=y(i)+n(i)$. One example of a logging tool which provides measurements of this nature is a device responsive to $\gamma$-ray irradiation, and another example is any type of logging tool utilizing neutron formation irradiation. Other examples obviously exist and are believed to be well known to those of average skill in the art. This signal is the intrinsic data variable (e.g. radioactivity profile with depth) smeared (convolved) by the system function (e.g. the detector's vertical resolution); $y(i)=s(i) * h(i)$. The function, s(i), is the intrinsic variable and h(i) is the system function. The asterisk is used to denote the convolution process classically defined:

$$s(i)*h(i) = \sum_{j=i-m}^{i+m} s(j)h(j) \qquad (1)$$

where 2m+1 is the effective width of the system function. In the ensuing discussion, the discretization parameter (i) is suppressed for clarity of expression. The primary purpose is not to deconvolve but to optimally process x to recover y. As will be seen from the mathematical basis of the process to be undertaken, continuous functions of the sort typically obtained from analogue measuring devices are not involved here; rather, this disclosure is directed to those systems which provide discrete or finite measurements. In that light, the present apparatus is particularly useful with systems forming pulse count outputs, and such systems typically involve radiation responsive detection crystals which provide light photons to a photomultiplier tube. There are other structures which provide similar outputs, and this is merely representative of one such structure.

Traditional filtering techniques attempt to recover y by smoothing x to reduce the noise n. Usually, a substantial reduction of n is obtained at the expense of further smearing y (i.e. a further loss of vertical detail). Here, a different approach is pursued. An initial guess for y is obtained by convolving the log data with the system function h as, $$y_1=x*h. \qquad (2)$$

This smooths x with some loss of vertical resolution. The second approximation to y is taken as, $$y_2=y_1+(x-y_1)*h \qquad (3)$$

This quantity $(x-y)$ consists of noise and the bed boundary information that was lost in $y_1$. If there were no noise in x, adding this difference back to $y_1$ would recover y exactly. However, convolving this difference with the system function h is necessary to suppress the noise while retaining some of the boundary information which is then added back into the initial estimate. Subsequent approximations to y are:

$$y_k = y_{k-1} + (x - y_{k-1})*h \qquad (4)$$

Repeated application of this procedure will, in principal, recover y to within acceptable statistical limits. In practice, the third or fourth approximation is virtually indistinguishable from the optimum result. Moreover, the iterative procedure must be terminated as soon as possible because any sharpening that results from increased iterations occur at the expense of increased statistical noise.

RESULTS ON SIMULATED DATA

The upper plot in FIG. 1 shows an arbitrary intrinsic depth profile (solid line) which might be a $\gamma$-ray log. The curve denoted by data points representing y was found by convolving the depth profile (the solid curve) in this same figure sampled at 0.1' with the system transfer function shown in FIG. 2. In the bottom plot in FIG. 1, random noise is added based on counts per sample assuming a logging speed of 0.5'/sec. The smoothing algorithm was applied to these data. The representative scatter of discrete measurements shown in the bottom plot of FIG. 1 illustrates the difficulty of noise reduction. In particular, the present system is directed to noise reduction, thereby improving the signal to noise ratio, while preserving the shape of the profile, referring to the solid line shown in the upper plot of FIG. 1. FIG. 2 shows a Gaussian like transfer function. It is normalized for an integrated amplitude of 1.00. It is typical of the Gaussian transfer function which the sensor system may implement. Of course, that is discussed in detail below.

Applying equations 2, 3 and 4 above additional approximations can be obtained. The plots of FIGS. 3A, 4A and 5A shows the results at the end of the second, fourth and sixth approximations respectively. The plot in each of FIGS. 3B, 4B and 5B is the filtered noise, which as expected, is reduced by increasing the number of iterations. Notice in the plot of FIG. 3 that the bed boundary information is retained. After the fourth iteration the sharpening effect starts to make statistical noise noticeable again without visibly improving the bed boundary resolution. This is especially apparent at the ends of the log and on the ramp section where additional curve peaks are evident. While the number of approximations can be increased, it is believed that the benefits are negligible in contrast with the added difficulties. Accordingly, extension beyond FIGS. 4A and 4B is believed to be unnecessary. Since the goal is noise reduction which enhances signal preservation, extending to the fifth or greater approximation is believed unneeded.

Figure 9:
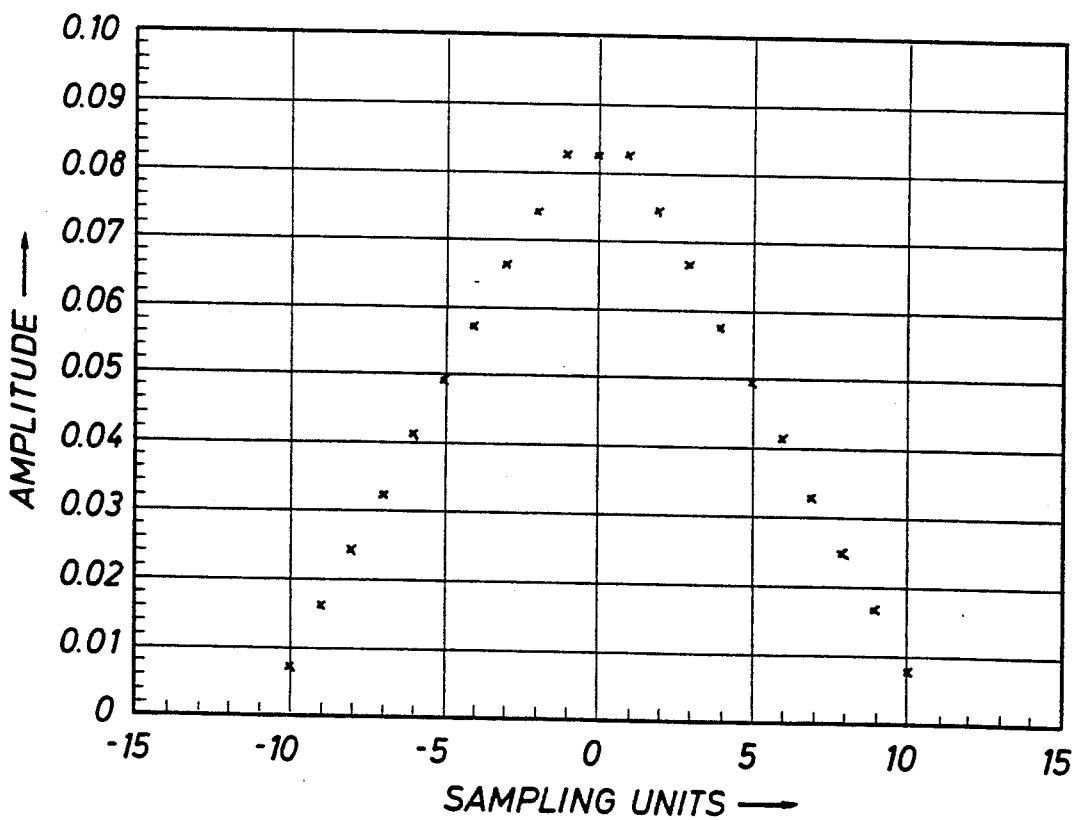
FIG. 9 is a normalized transfer function similar to FIG. 2 showing a trapezoidal shaped system transfer function.
Figure 6A:
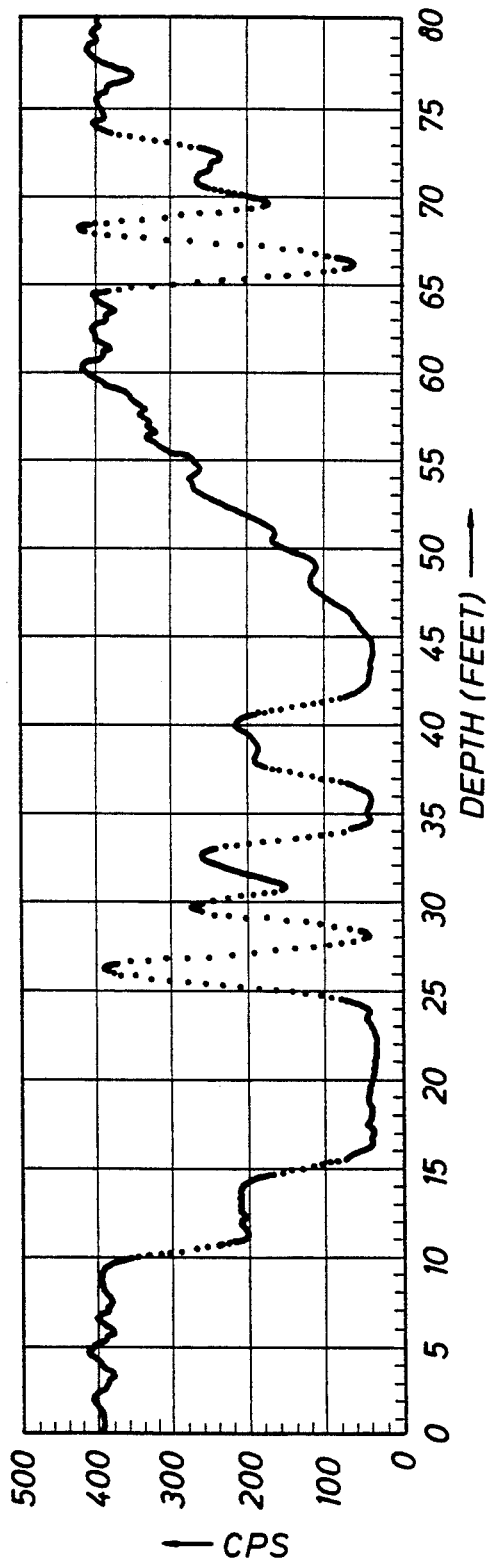
Figure 6B:
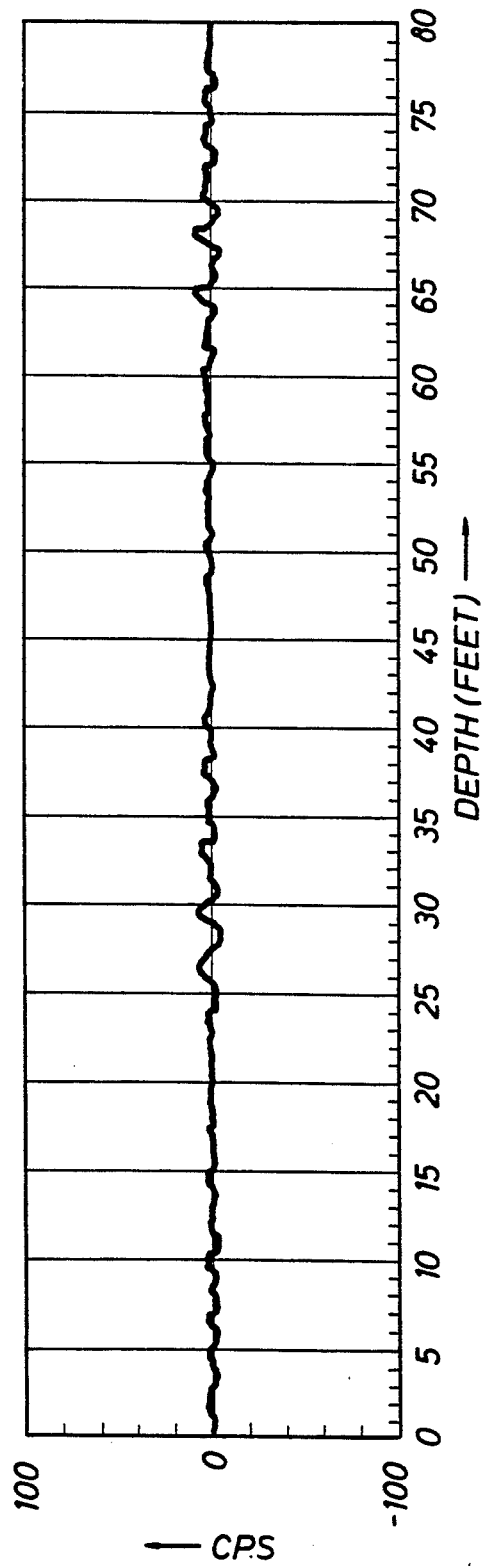

FIGS. 6A, 6B, 7A and 7B show the results of the fourth approximation applied to two additional different sets of statistical data. The differences in value as a function of depth are due to statistical uncertainty. Of necessity, the results are never better than the statistical uncertainty allows. By contrast, FIGS. 8A and 8B show the results for the fourth approximation of the algorithm for a trapezoidal shape system function h shown in FIG. 9. This function has roughly the same width as the original system function h. The similarity with the previous results indicates that the procedure is significantly insensitive to the shape of the system function h provided it is smooth. Accordingly, a rectangular filter function will lead to serious ringing in the filtered log.

RESULTS ON SPECTRAL DATA

Figure 10:
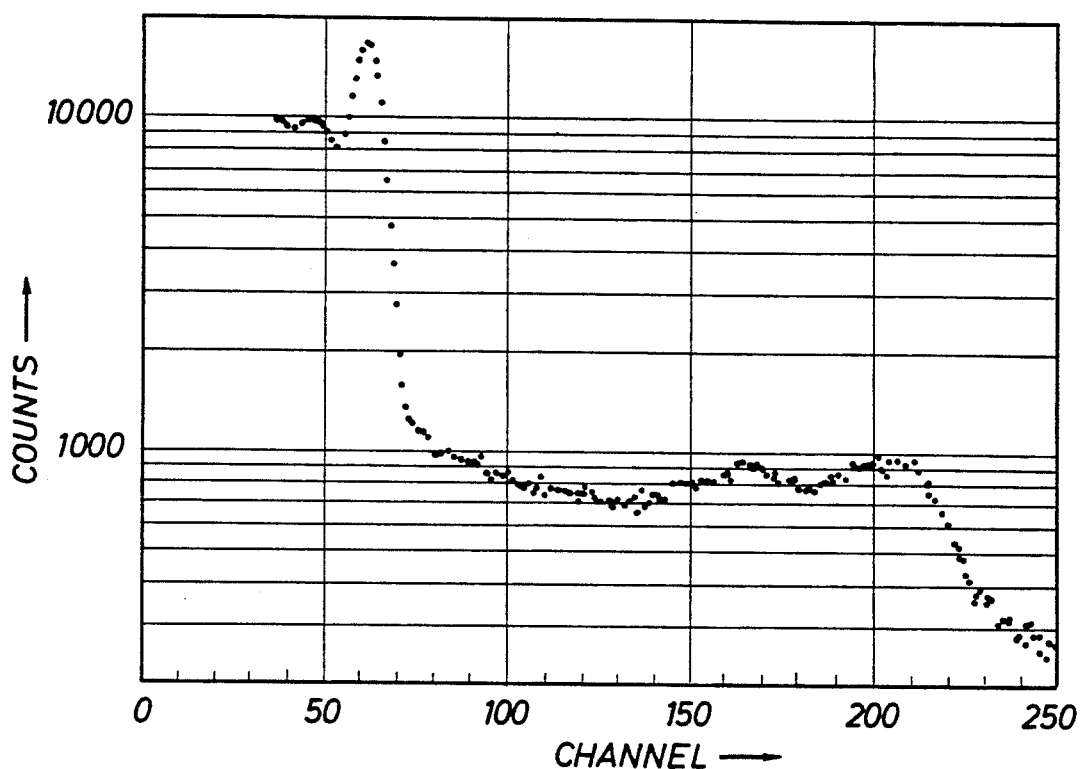
FIG. 10 shows a typical $\gamma$-ray spectrum illustrating the discrete nature of the recorded events.
Figure 11:
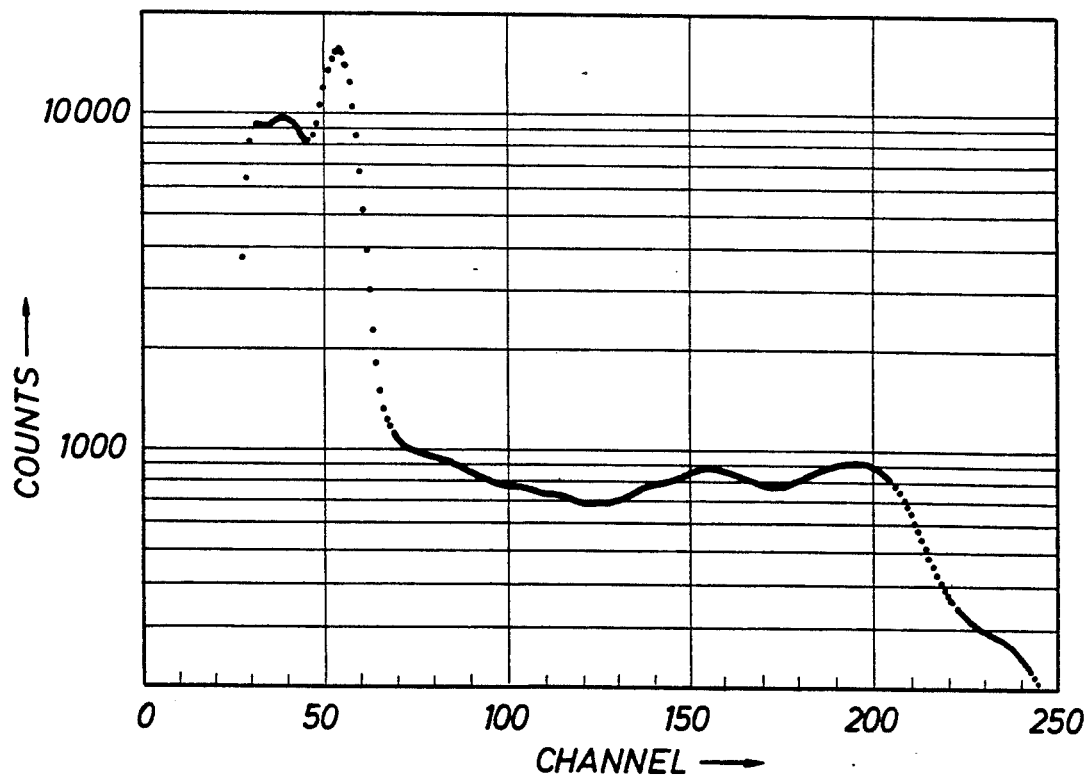
FIGS. 11, 12 and 13 show processing of the data represented in FIG. 10.
Figure 12:
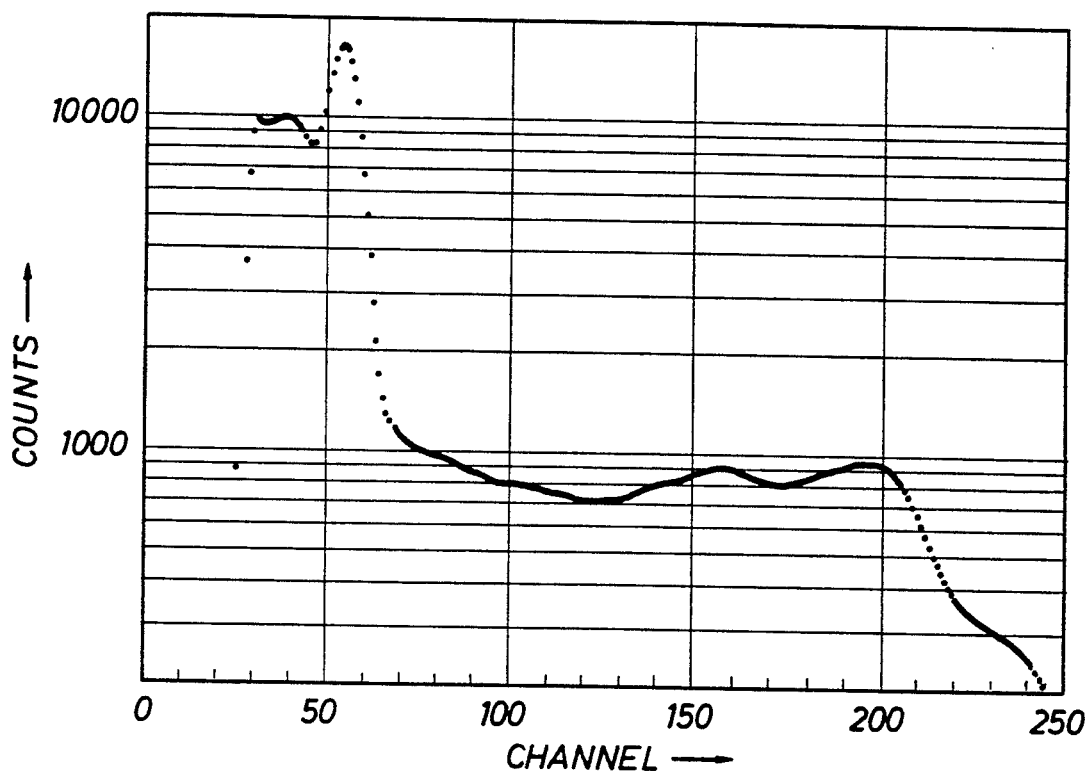
Figure 13:
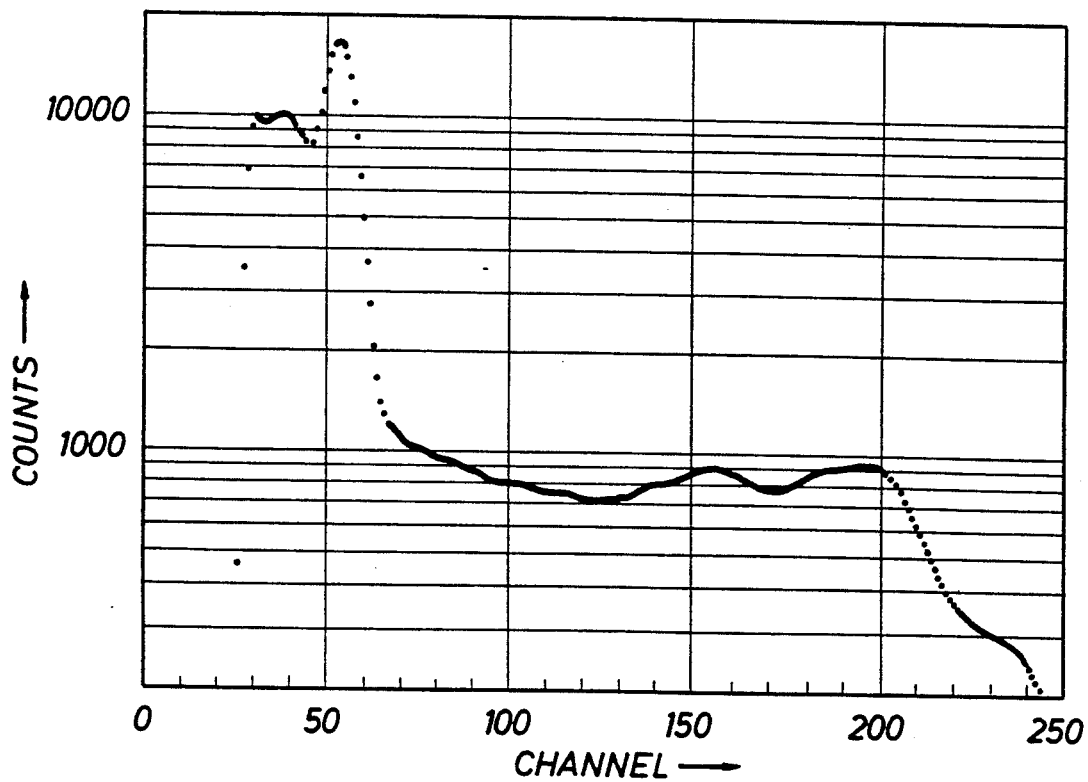

A laboratory $\gamma$-ray spectrum is shown in FIG. 10 and particularly showing the discrete nature of the measured events. Since the resolution for this case is energy dependent, the detector resolution was determined and parameterized as a function of energy or equivalent channel number in the spectrum. The smoothing alogrithm was applied to these data using the transfer function of the detector (a Gaussian) and the results for multiple iterations are shown in FIGS. 11 and following. FIGS. 11, 12 and 13 are all obtained from the set of discrete measurements which are represented in FIG. 10. This set of data, typical of a $\gamma$-ray spectrum, is shown in FIGS. 11, 12 and 13 where it has been processed through three different approximations. The presentation of this data and the contrast in the fourth approximation illustrates that there is little value in obtaining an excessive number of approximations. Accordingly, the several passes can be reduced to one in accordance with the teachings found below.

FURTHER REFINEMENTS

The prior art failed to recognize that any iteration can be expressed in terms of the initial raw data and a single filter function h representing all of the previous iterations for a given order. Such prior art is represented by H. C. Hayden, "Data smoothing routine", *Computers in Physics*, Nov/Dec 1987. This improvement can be clearly seen by successively substituting all the previous orders of iterations into the specific order of iteration.

Beginning with the second approximation, equation (3) states:

$$y_2 = x*h + (x - x*h)*h \qquad (5)$$

where $x*h$ has been substituted for $y_1$. Rearranging the above leads to, $$y_2 = x*(2h - h*h). \qquad (6)$$

Consequently, a new filter function $h_2$ can be defined such that, $$h_2 = 2h - h*h, \qquad (7)$$

and the results specified by the following single operation, $$y_2 = x*h_2. \qquad (8)$$

In a similar manner, one may obtain the third and fourth order iterations, $y_3$ and $y_4$:

$$y_3 = x*(3h - 3h*h + h*h*h) = x*h_3 \qquad (9)$$

and $$y_4 = x*(4h - 6h*h + 4h*h*h - h*h*h*h) = x*h_4 \qquad (10)$$

Figure 14:
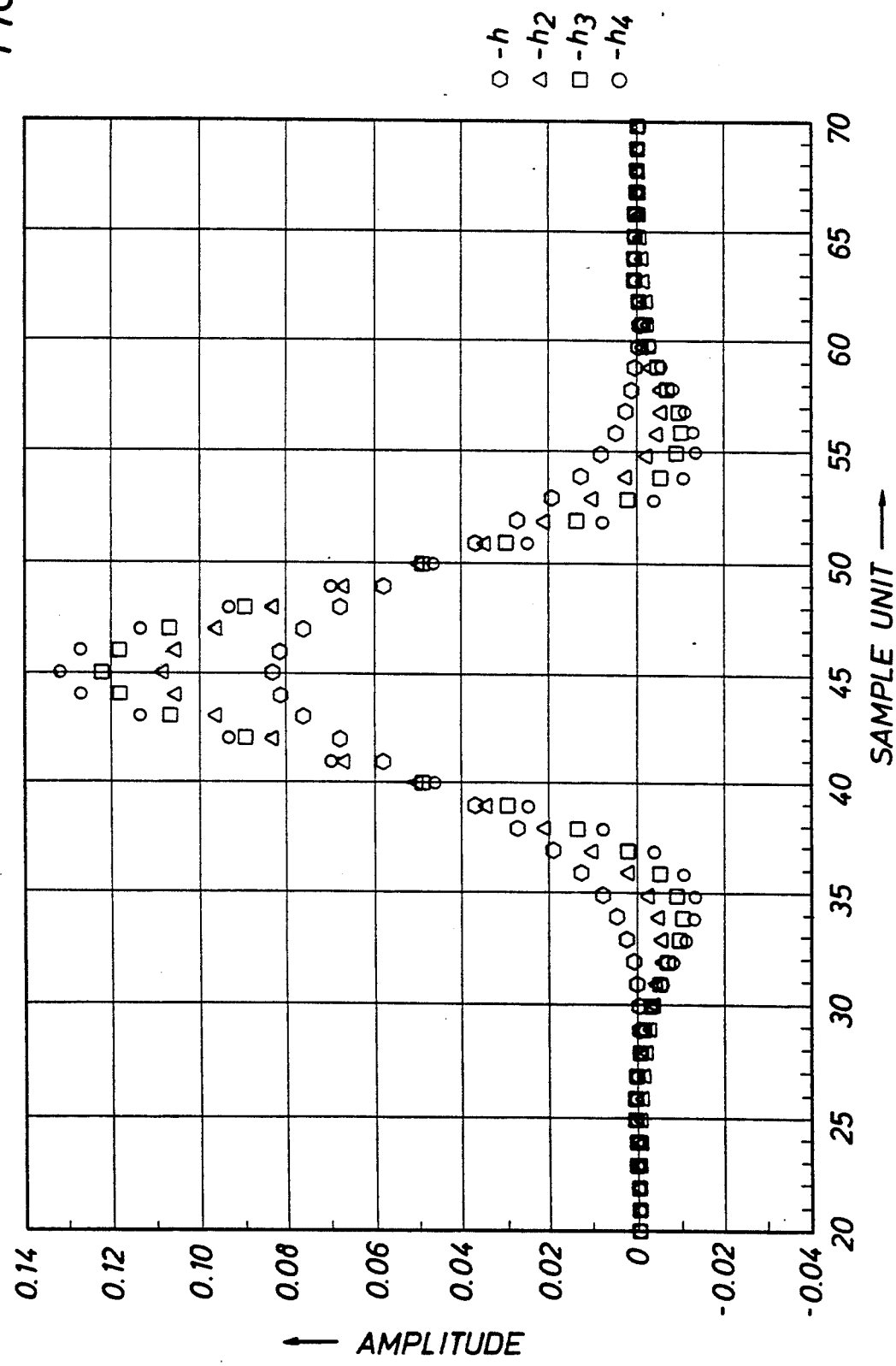
FIG. 14 shows four different filter transfer functions.

Although it is clear from the above discussion that higher order approximations beyond five can be found, they were not developed because they overemphasize the statistical noise and thereby depreciate data presentation. It is clear from the examples above that the filter transfer functions $h_n$ can be represented by $h_n = 1 - (1-h)^n$ wherein the expansion of this equation, $h^{(k)}$, ($k \leq n$) means the convolution of h with itself ($k-1$) times. While the calculation of $h_n$ for an arbitrary h can be complex, it needs only be done once for a given sensor of any complexity. For the special case of a Gaussian system function, which is a very good approximation to the real system function h for many applications, an analytic expression for the particular case $h_4$ can be obtained as discussed for the preferred embodiment described below, namely:

$$h_4 = \frac{\alpha}{\sqrt{\pi}} \left( 4x - 3\sqrt{2}\, x^{1/2} + \frac{4}{\sqrt{3}} x^{1/3} \frac{1}{2} x^{1/4} \right) \quad (11)$$

where $$x = e^{-\alpha^2 z^2} \quad (12)$$

and the exponential coefficient $\alpha$ is equal to 1.66/FWHM where FWHM is the full width (in samples) at half maximum of the Gaussian and z is the value (in samples) of the displacement from the center of the Gaussian. FIG. 14 shows the form of the Gaussian functions h, $h_2$, $h_3$ and $h_4$ where h is the system function (a Gaussian) and the others are filter functions corresponding to different iteration levels. Notice that the higher order filter functions become steep with progressively deeper negative side lobes.

A simple filtering algorithm is described above that results in optimal smoothing within the constraints of retaining good vertical detail after only a few iterations. A refinement of this procedure and the object of this invention involving higher order filter functions produces the equivalent operation in a single pass, and avoids multiple passes. In the special case of a Gaussian system function, an analytic expression for the spatial filtering coefficients is obtained below. The preferred filter is computationally efficient and is applicable to realtime log smoothing. Moreover, the filter is quite general in nature and can be applied to smooth $\gamma$-ray spectra in addition to discrete nuclear data.

FILTER FUNCTIONS FROM A GAUSSIAN SYSTEM FUNCTION

The procedure for determining the convolution of a Gaussian system function to any order is most readily obtained in the Fourier transform domain. For the simple case of a Gaussian convolved with itself, the convolution is a simple product of Gaussians in the transform space, which is also a Gaussian. Then, of course, the inverse of this Gaussian is also a Gaussian. Obviously, this procedure can be carried out to any order of convolution (or deconvolution) with a Gaussian result.

Thus, more specifically, consider the convolution of a function with itself:

$$h*h = ? \quad (13)$$

or more generally:

$$h^k = ? \quad (14)$$

where $h^n$ means convolving a function n times with itself. For a normalized Gaussian:

$$h(z) = \frac{\alpha}{\sqrt{\pi}} e^{-\alpha^2/z^2} \quad (15)$$

The Fourier transform in the frequency domain is a simple cosine transform by virtue of its even character:

$$H(\omega) = \frac{\alpha}{\sqrt{\pi}} \int_{-\infty}^{+\infty} e^{-\alpha^2 z^2} e^{-i\omega z} dz = \quad (16)$$

$$\frac{2\alpha}{\sqrt{\pi}} \int_{-\infty}^{+\infty} e^{-\alpha^2 z^2} \cos(\omega z) = e^{-\omega^2/4\alpha^2}$$

Now for a single convolution, $$h(z)*h(z) = \int_{-\infty}^{+\infty} h(x)h(z-x)dx = \quad (17)$$

$$\frac{1}{2\pi} \int_{-\infty}^{+\infty} H(\omega)H(\omega)e^{i\omega z}d\omega$$

so that, $$h^2 = \frac{1}{\pi} \int_{0}^{+\infty} H^2(\omega)\cos(\omega z)d\omega \quad (18)$$

Now, substituting the expression for $H(\omega)$ (equation 16):

$$h^2(z) = \frac{1}{\pi} \int_{0}^{+\infty} e^{-\omega^2/2\alpha^2} \cos(\omega z) d\omega \quad (19)$$

gives, $$h^2(z) = \frac{1\alpha}{\sqrt{2}\sqrt{\pi}} e^{-\alpha^2 z^2/2} \quad (20)$$

If one will continue with this procedure to $h^3$.

$$h^3(z) = h(z)*h(z)*h(z) = \frac{1}{\pi} \int_{0}^{+\infty} H^3(\omega)\cos(\omega z)d\omega \quad (21)$$

and substituting the expression for $H(\omega)$ (equation 16):

$$h^3(z) = \frac{1}{\pi} \int_{0}^{+\infty} e^{-3\omega^2/4\alpha^2}(\omega)\cos(\omega z)d\omega \quad (22)$$

gives:

$$h^3(z) = \frac{1}{\sqrt{3}} \frac{\alpha}{\sqrt{\pi}} e^{-\alpha^2 z^2/3} \quad (23)$$

Noting the progression of equations (15), (20) and (23), the general solution is:

$$h^n(z) = \frac{1}{\sqrt{n}} \frac{\alpha}{\sqrt{\pi}} e^{-\alpha^2 z^2/n} \quad (24)$$

which is the Gaussian generalized form. Using this expression, $h_4$ in equation (10) can be evaluated:

$$h_4 = 4h - 6h^2 + 4h^3 - h^4 \quad (25)$$

-continued

Consequently, $$h_4 = \frac{\alpha}{\sqrt{\pi}} \left( 4e^{-a^2z^2} - \frac{6}{\sqrt{2}} e^{-a^2z^2/2} + \frac{4}{\sqrt{3}} e^{-a^2z^2/3} - \frac{1}{2} e^{-a^2z^2/4} \right) \quad (26)$$

A PREFERRED EMBODIMENT

Figure 15:
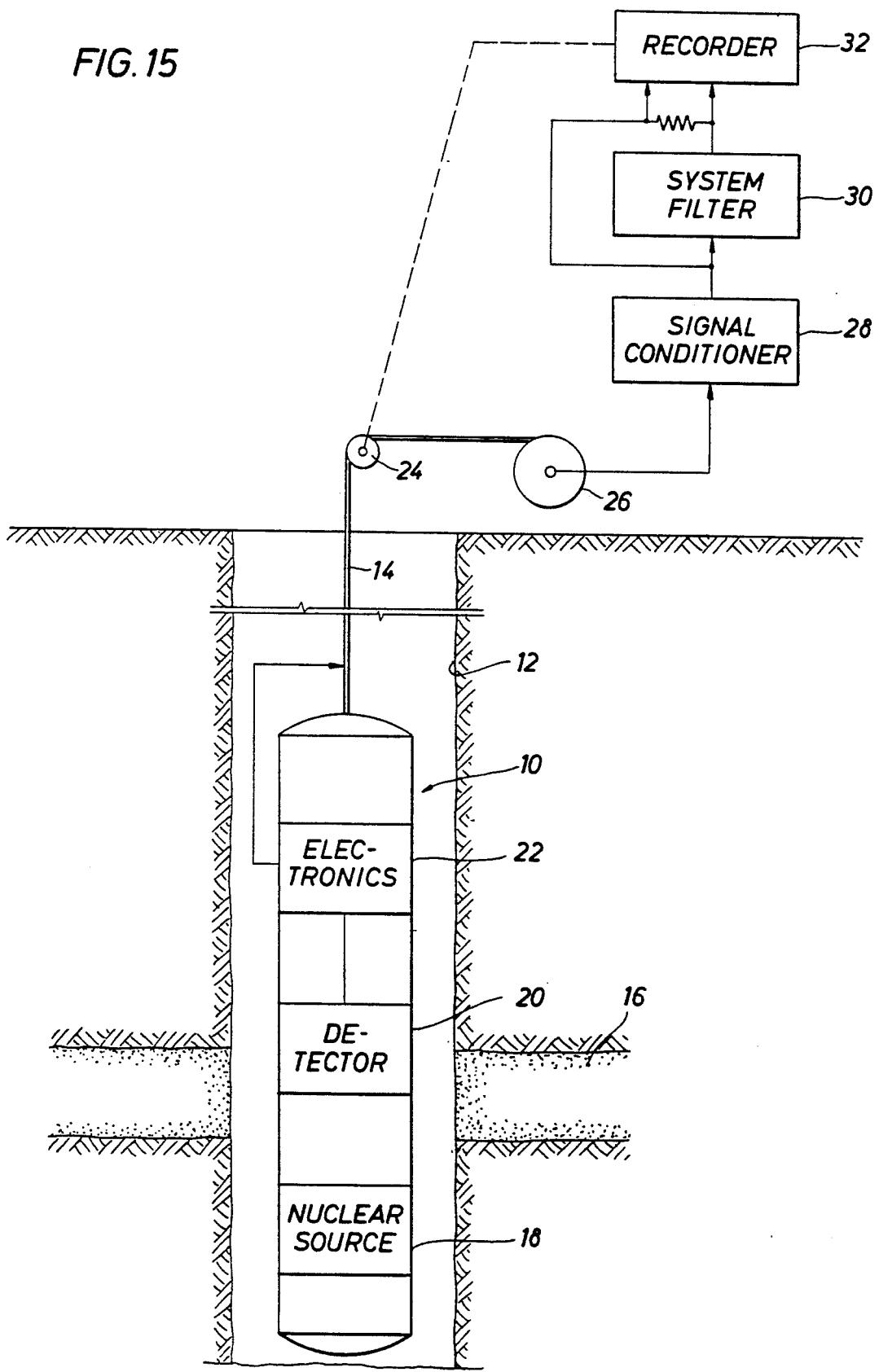
FIG. 15 shows a typical logging tool in a well borehole for obtaining data which is processed in accordance with the method of the present disclosure.

From the foregoing, and especially utilizing the convolved Gaussian transfer function shown in FIG. 14, a single pass filter can be provided. As viewed in FIG. 14, if a single pass based on a single iteration is required, that is shown in FIG. 14. If a different number is required, the convolution discussion found above, as it relates to multiple passes through the filter, suggests how the filter can then be provided so that it implements, in a single pass, that which is equal to multiple passes. Accordingly, computation is reduced because only a single pass filter is required. This is developed hereinabove in a generalized fashion for a Gaussian transfer function. Quite obviously, other transfer functions do exist. In general terms, it is highly undesirable to implement a square transfer function because of the problem of ringing; however, trapezoidal transfer functions are known and can be readily implemented in this fashion. Thus, the transfer function may represent multiple passes of a trapezoidal transfer function h. In any event, the teaching found herein can be applied to a variety of transfer functions recognizing that the preferred embodiment is the Gaussian transfer function, and in turn multiple passes can be implemented although only a single pass through the filter is implicated. With this in view, attention is now directed to FIG. 15. It shows the preferred embodiment of the present disclosure utilizing the filtering techniques taught herein. In FIG. 15, the numeral 10 identifies a logging tool in a well borehole 12 and supported on a logging cable 14 having one or more electrical conductors therein. It is raised along the borehole 12 to provide data of the various formations encountered by the borehole. One such formation is indicated at 16. The sonde that encloses the apparatus within the logging tool is illustrated with typical equipment. This is representative because the present apparatus can operate with other types of logging systems which measure the same or different phenomena, all having in common an output which is a discrete measurement exemplified by pulse height, total counts during an interval, etc. In any event, the sonde 10 in this representative system includes a nuclear source 18 which irradiates the adjacent formations and which causes some kind of response which is observed at the detector 20. The exemplary source is the used with certain type measuring devices 20; the present disclosure also works well with other tools measuring phenomena not requiring a source. The output signal is provided to an electronic system 22 which includes appropriate amplifiers and telemetry equipment. In turn, that delivers the signal on an electrical conductor extending along the logging cable. The logging cable 14 extends to the surface and passes over a sheave 24. The sheave directs the cable to a large drum or spool 26 where the cable is stored. Typically, the cable is several thousand feet in length.

The conductors in the cable connect with signal conditioning circuitry 28. This typically includes telemetry equipment and the like. In any event, the output signal is provided in a suitable format to the signal conditioner and is processed through a system filter 30 in accordance with the teachings of this disclosure. That data is input to a recorder 32. As desired, the recorder 32 can record the unprocessed data and the processed data. This is the contrast which is especially illustrated in the discrete data points shown in the lower part of FIG. 1 in contrast withe the curve shown in the upper part of FIG. 1. This also is exemplified in the γ-ray spectra data of FIG. 10 in contrast with the subsequent smooth γ-ray spectral curves in FIG. 11 and following. As can be imagined, the data is recorded as a function of depth and as exemplified in FIG. 1 (note the abscissa of the data) so that the discrete data can be represented.

The system filter 30 thus implements the filter transfer function and requires only a single pass of the data through the filter. The single pass is in lieu of multiple iterations as taught hereinabove because the filter transfer function can be made equal to multiple iterative passes. The filter transfer function is derived from the sensor system transfer function, and that can often be represented by a Gaussian curve. Once the characteristics (exact or approximate) of the sensor system transfer function are known through calibration techniques readily implemented, the filter transfer function for the filter 30 can then be implemented.

While the foregoing is directed to the preferred embodiment, the scope thereof is determined by the claims which follow:

What is claimed is:

1. A method of reducing noise in a series of discrete data obtained in logging a well borehole comprising the steps of:
   (a) obtaining from a sensor moving along a well borehole a series of discrete data along a well borehole as a function of depth wherein the data is presented in serial form as a signal encoding the data;
   (b) filtering the data signal from the moving sensor in a single pass through a filter means to improve the signal to noise ratio of the signal while retaining significant data detail; and
   (c) wherein the filter means has a filter transfer function derived from the system transfer function of, or approximating that of, said sensor, and wherein the system transfer function is given by h and the filter means has a transfer function determined by the general form $$h_n = 1 - (1-h)^n$$

where n is a positive whole number integer and $h^k$ for $k < n$ is the convolution of h with itself $k-1$ times.

2. The method of claim 1 wherein a logging sonde is moved along a well borehole and formations adjacent thereto are irradiated to create a response interacting with said sensor to form the discrete data signal along the well borehole.

3. The method of claim 2 wherein measurements are made of said sensor to obtain a transfer function of said sensor, and further wherein said filter means is derived from the measured system transfer function.

4. A method of reducing noise in a series of discrete data in a signal obtained in logging a well borehole comprising the steps of:

(a) obtaining from a sensor a series of discrete data along a well borehole as a function of depth wherein the data is presented in serial form as a signal encoding the data;
(b) defining a Gaussian transfer function for said sensor;
(c) forming a filter having a transfer function derived from said Gaussian transfer function h and determined by the general form $$h_n = 1 - (1-h)^n$$

where n is a positive whole number integer and $h^k$ for $k<n$ is the convolution of h with itself $k-1$ times; and
(d) processing the discrete data signal through the filter in a single pass to improve the signal to noise ratio of the discrete data signal while retaining significant data detail.

5. The method of claim 4 wherein the filter transfer is derived for n equals 4.

6. The method of claim 4 wherein the filter transfer is derived for n equals 3.

7. The method of claim 4 wherein the filter transfer is derived for n equals 2.

8. The method of claim 4 wherein data is taken at calibrated depths along the well borehole, and data over a specified depth along that borehole is serially input to said filter.

9. A method of collecting data from a well borehole comprising the steps of:
(a) moving a well logging sonde along a well borehole by lowering the sonde in the well borehole and thereafter raising the sonde on a logging cable;
(b) measuring a selected type of nuclear event along the well borehole from the sonde and encoding the selected nuclear event as a signal representing the event serially output as a function of depth in the well borehole;
(c) forming a filter having an input for sequential discrete data wherein said filter has a transfer function which is derived from a Gaussian full width, half maximum of specified value and said filter has a transfer function represented by the general form $$h_n = 1 - (1-h)^n$$

where h is the Gaussian transfer function and n is a small positive integer; and
(d) over a specified depth interval along the well borehole, inputting the measured nuclear events to said filter in a single pass for real-time filtering to obtain an output data with reduced noise.

10. The method of claim 9 wherein data is taken at calibrated depths along the well borehole, and data over a specified depth along the borehole is serially input to said filter.

* * * * *